(12) United States Patent
Raksincharoensak et al.

(10) Patent No.: US 7,668,635 B2
(45) Date of Patent: Feb. 23, 2010

(54) FRONT WHEEL STEERING CONTROL DEVICE

(75) Inventors: Pongsathorn Raksincharoensak, Fuchu (JP); Masao Nagai, Fuchu (JP)

(73) Assignee: National University Corporation Tokyo University of Agriculture and Technology, Fuchu-Shi, Tokyo (JP)

( * ) Notice: Subject to any disclaimer, the term of this patent is extended or adjusted under 35 U.S.C. 154(b) by 0 days.

(21) Appl. No.: 11/659,204

(22) PCT Filed: May 18, 2005

(86) PCT No.: PCT/JP2005/009495

§ 371 (c)(1),
(2), (4) Date: Feb. 2, 2007

(87) PCT Pub. No.: WO2006/027875

PCT Pub. Date: Mar. 16, 2006

(65) Prior Publication Data

US 2007/0299582 A1 Dec. 27, 2007

(30) Foreign Application Priority Data

Aug. 6, 2004 (JP) .............................. 2004-230241

(51) Int. Cl.
| | |
|---|---|
| B62D 12/00 | (2006.01) |
| A01B 69/00 | (2006.01) |
| B63G 8/20 | (2006.01) |
| G05D 1/00 | (2006.01) |
| B62D 6/00 | (2006.01) |
| B62D 11/00 | (2006.01) |
| B62D 11/02 | (2006.01) |
| B62D 3/00 | (2006.01) |
| B62D 7/00 | (2006.01) |
| B60S 9/00 | (2006.01) |

(52) U.S. Cl. .......................... 701/41; 180/204; 180/6.2; 180/400

(58) Field of Classification Search ...................... None
See application file for complete search history.

(56) References Cited

U.S. PATENT DOCUMENTS

| | | | | | |
|---|---|---|---|---|---|
| 4,830,127 | A | * | 5/1989 | Ito et al. ...................... | 180/446 |
| 4,878,557 | A | * | 11/1989 | Shibahata et al. ........... | 180/415 |
| 4,951,207 | A | * | 8/1990 | Furukawa et al. ............. | 701/42 |
| 5,615,117 | A | * | 3/1997 | Serizawa ...................... | 701/42 |
| 6,240,350 | B1 | * | 5/2001 | Endo ........................... | 701/41 |
| 6,301,534 | B1 | * | 10/2001 | McDermott et al. ........... | 701/41 |
| 6,415,212 | B2 | * | 7/2002 | Nishizaki et al. .............. | 701/41 |
| 6,499,559 | B2 | * | 12/2002 | Mc Cann et al. ............ | 180/446 |
| 6,691,008 | B2 | * | 2/2004 | Kondo et al. ................... | 701/41 |
| 6,876,911 | B2 | * | 4/2005 | Chen et al. ..................... | 701/41 |
| 7,143,864 | B2 | * | 12/2006 | Mattson et al. ............. | 180/446 |

FOREIGN PATENT DOCUMENTS

JP        H03-235761        10/1991

OTHER PUBLICATIONS

Steering Control of Steer-By-Wire Vehicle for Enhancing Handling and Stability, Shunsuke Watanabe et al; p. 17 to 22.

* cited by examiner

*Primary Examiner*—Khoi Tran
*Assistant Examiner*—Nicholas Kiswanto
(74) *Attorney, Agent, or Firm*—Manabu Kanesaka

(57) ABSTRACT

A front wheel steering control device improves the handling and stability of a vehicle with respect to the steering wheel angles. The front wheel steering control device includes an input device for obtaining the steering wheel angle and the vehicle velocity, a first computing device for computing a yaw-rate for the vehicle which maintains the vehicle gravity center point sideslip angle at zero based on the steering wheel angle and the vehicle velocity that are obtained by the input device, a second computing device for computing a target front wheel actual steering angle for realizing the yaw-rate calculated by the first computing device, a control device for performing a steering control of the vehicle based on the target front wheel actual steering angle calculated by the second computing device. The ideal determination of the vehicle steering gear ratio and the derivative steering gain are relatively easy.

2 Claims, 11 Drawing Sheets

FRONT WHEEL STEERING CONTROL DEVICE

TECHNICAL FIELD

This invention relates to a front wheel steering control device for improving the handling and stability of a vehicle.

BACKGROUND ART

As one of safety technologies for reducing traffic accidents, technologies for improving the driving stability have been developing. The technologies for improving the handling and stability are the yaw-moment control method by transverse distribution of driving/braking forces, the front wheel active steering control method, etc. Various proposals have been made for the steering gear ratio control technique in a front wheel active steering system where the front wheels of a vehicle are not mechanically connected to the steering wheel. By the steering gear ratio control technique the gear ratio (steering angle ratio) of the steering wheel ratio to the actual steering angle of the wheel tires is changed according to the running condition. As a result, the vehicle response can be matched with the driver's sensitivity and the driving stability is improved.

In general, by reducing the steering angle ratio at a low velocity the steering amount is reduced and therefore the steering effort is reduced. And, the running stability is secured by increasing the steering angle ratio at a high velocity.

For example, VGR (Variable Gear Ratio) technique, disclosed in Japanese Laid-open Patent No. H07-323852, varies the gear ratio depending upon the steering angle by increasing the mating pitch from the center of rack teeth toward the end of a rack and pinion. Japanese Laid-open Patent No. H11-78937 discloses VGS (Variable Gear-Ratio Steering) technique for varying the gear ratio according to the vehicle velocity and the steering wheel angle.

Japanese Laid-open Patent No. H11-301507 discloses VGRS (Variable Gear Ratio Steering) technique for varying the gear ratio according to the vehicle velocity and the road surface friction factor and adding a differential operation of steering.

DISCLOSURE OF INVENTION

The purpose of steering gear ratio control is to improve the handling and stability of automobiles. However the designs by trial-and-error method based on driver's sensitivity evaluation are widely used and designs of steering gear ratio essentially based on handling and stability theories of automobiles have been rarely done.

In case of a quick steering wheel operation, the front wheel actual steering angle is determined based on the differential value of the steering angle, however the optimal designs are rarely based on the theories. Although the attempts to seek desirable steering gear ratio characteristics are made in view of the easiness of control by drivers, enough clear and quantitative calculation of gear characteristics is not available.

The purpose of the present invention is to provide a front wheel steering control device for improving the steering stability of vehicles with regard to the steering wheel angle based on a vehicle handling and stability theory.

In order to achieve the above mentioned purpose, a front wheel steering control device for improving the handling and stability of vehicles according to the present invention comprises input means for obtaining a steering wheel angle and a vehicle velocity, first computing means for computing the yaw-rate of the vehicle for maintaining the sideslip angle at the center of the gravity of the vehicle body at zero based on the steering wheel angle and the vehicle velocity obtained by the input means, second computing means for computing a target front wheel actual steering angle to realize the yaw-rate computed by the first computing means, and control means for controlling the steering of the vehicle based on the target front wheel actual steering angle computed by the second computing means.

According to the present invention, the target front wheel actual steering angle can be computed by adding a feed forward actual steering angle that is a differential value of the steering wheel with the first-order delay element to a feed forward actual steering angle that is in proportion to the steering wheel angle of the vehicle.

DETAILED DESCRIPTION OF PREFERRED EMBODIMENT

Figure 1:
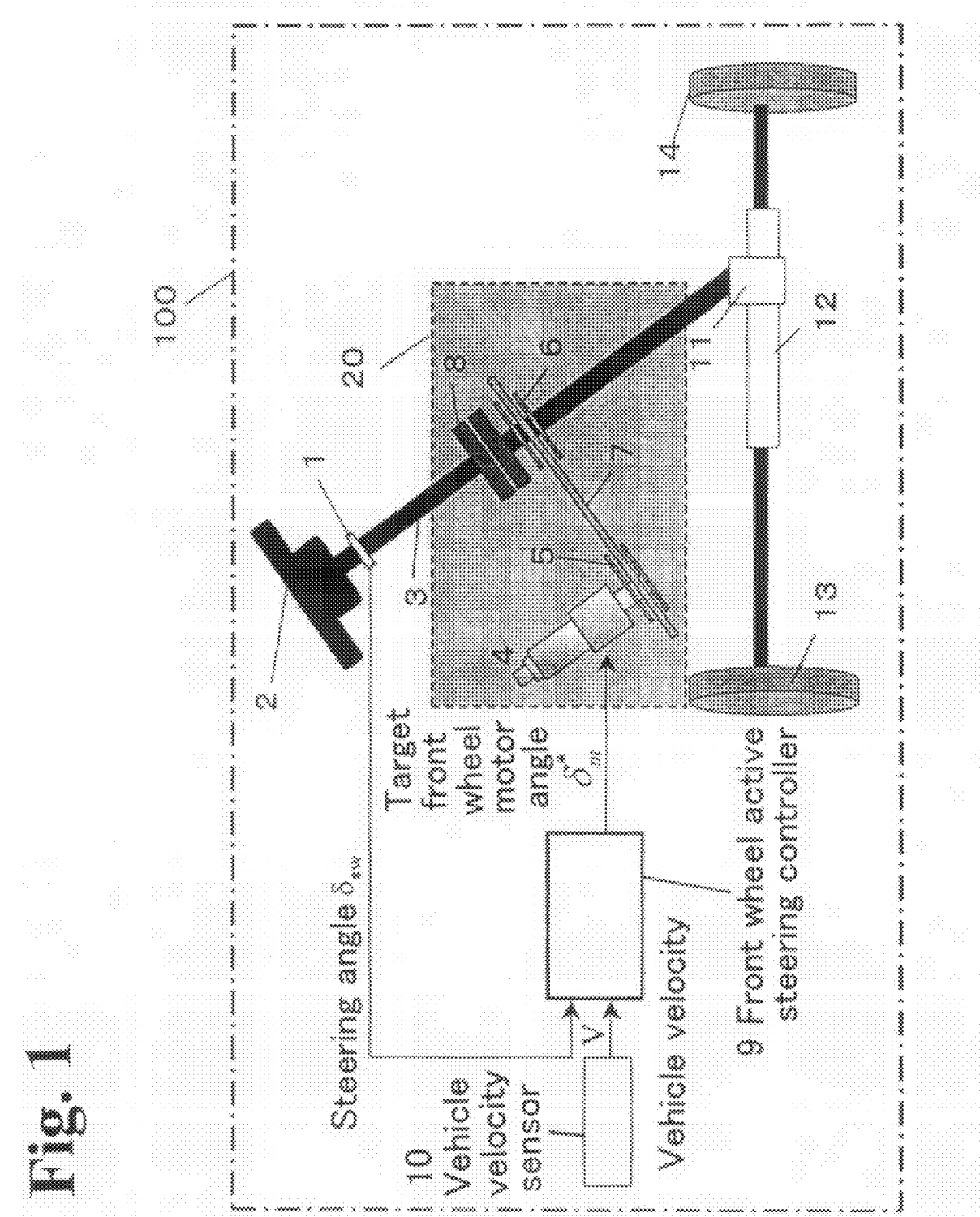
FIG. 1 is a block diagram showing the general structure of the vehicle 100 according to one embodiment of the present invention.

One embodiment of the invention will be explained below referring to the drawings.

FIG. 1 is a block diagram showing the general structure of the vehicle 100 according to an embodiment of the present invention. Reference numeral 1 shows a steering sensor, 2 shows a steering wheel, 3 shows a steering shaft, 4 shows a front wheel steering motor, 5 and 6 show pulleys, 7 shows a belt, 8 shows a electromagnetic clutch, 9 shows a front wheel active steering controller (input means, first computing means, second computing means, control means, third computing means and output means), 10 shows a vehicle velocity sensor, 11 shows a pinion, 12 shows a rack, 13 and 14 show front wheel tires and 20 shows a front wheel steering device.

The steering sensor 1 detects the rotation angle of steering wheel 2 from the output voltage of a variable resistor (not shown), transforms the rotation angle to a steering wheel angle δ SW, and outputs it to the front wheel active steering controller 9.

The vehicle velocity sensor 10 detects the rotation velocity of the non-drive wheels by an optical velocity meter (not shown), transforms it to the vehicle velocity V, and outputs the vehicle velocity V to the front wheel active steering controller 9.

The front wheel active steering controller 9 comprises a distributed computer based digital signal processing system (not shown), and computes a target front steering motor angle δ m* based on the steering wheel angle δ SW that is detected by the steering sensor 1 and the vehicle velocity V that is detected by the vehicle velocity sensor 10.

The front wheel steering device 20 is mounted at the upper part of the steering shaft 3 and the pinion 11 is mounted at the lower part of the steering shaft 3. The front wheel steering device 20 consists of a steering actuator for actively steering the front wheel tires 13 and 14, and comprises a pulley 6 coaxially mounted on the steering shaft 3, a belt 7 mating with the pulley 6, a pulley 5 mating with the belt 7, and a front wheel steering motor 4 rotationally driving the pulley 5.

The front wheel tires 13 and 14 are equipped with a conventional rack and pinion type steering mechanism. This steering mechanism includes a rack 12 which is connected to the steering axis (tie-rod) of the front wheel tires 13 and 14, a pinion 11 which mates with the rack 12, a steering shaft 3 which rotates the pinion 11 by a steering force that is applied to the steering wheel 2.

In the steering mechanism that is used for the present invention, the steering wheel 2 and the front wheel tires 13,14 are not mechanically directly connected in order to avoid interference between a steering input from the driver and a control input from the motor. To do so, the steering shaft 3 is disconnected at its upper part. The electromagnetic clutch mechanism 8 is mounted on the steering shaft 3 at the position that is upper than that of the pulley 6, and when the front wheel steering motor 4 becomes out of order, a steering force which is applied to the steering wheel 2 is directly conveyed to the front wheel tires 13,14 through the steering shaft 3, pinion 11 and rack 12 with the electromagnetic clutch mechanism 8.

The operation of the front wheel active steering controller 9 having the above mentioned structure will be explained below referring to FIG. 2. This operation is performed by a sampling time of 0.1 millisecond.

When the driver rotates the steering wheel 2 while driving, the steering sensor 1 detects the steering wheel angle δ SW, and the vehicle velocity sensor 10 detects the vehicle velocity V. The detected steering wheel angle δ SW and vehicle velocity V are input to the front wheel active steering controller 9 (Step S1).

The front wheel active steering controller 9 computes the target yaw-rate γ d from the equation (1) using the detected steering wheel angle δ SW and the vehicle velocity V (Step S2).

$$\frac{\gamma_d(s)}{\delta_{sw}(s)} = \frac{k_{\gamma d}}{\tau_{\gamma d} s + 1} \quad (1)$$

"k γ d" and "τ γ d" are the steady-state gain and the time constant of the target yaw-rate respectively and are given by the equation (2) and (3). "s" is the operand of Laplace Transformation. In the present invention, the response of the yaw-rate for the steering wheel angle is set to the first-order delay characteristic in order to improve the stability at a high velocity.

The steady-state gain k γ d and the time constant τ γ d of the target yaw-rate γ d computed at the step S2 are set to the values that are equal to those of the yaw-rate response of zero-vehicle body-sideslip-angle four wheel steering type with a good steering stability. The steady-state gain k γ d and the time constant τ γ d are given by the following equations (2) and (3).

$$k_{\gamma d} = \frac{V}{l_f \left(1 + \frac{m l_r V^2}{2 l l_f C_f}\right)} \cdot \frac{1}{N} \quad (2)$$

$$\tau_{\gamma d} = \frac{l_z V}{m l_r V^2 + 2 l l_f C_f} \quad (3)$$

V represents the vehicle velocity, lf represents the distance between the front wheel axis and the gravity center point, l represents the wheelbase, N represents the gear ratio of the rack and pinion, m represents the vehicle weight, lr represents the distance between the rear wheel axis and the gravity center point, Cr represents the cornering power of front wheel tires, and Iz represents the yaw inertial moment.

Next, the front wheel active steering controller 9 computes the target front wheel actual steering angle δ f which is necessary to achieve the target yaw rate γ d that is computed in step S2 using Equation (4) (Step S4).

$$\delta_f(S) = G_{ff}(S) \delta_{SW}(S) \quad (4)$$

A feed-forward controller transform function Gff(s) is given by Equation (11).

Figure 3:
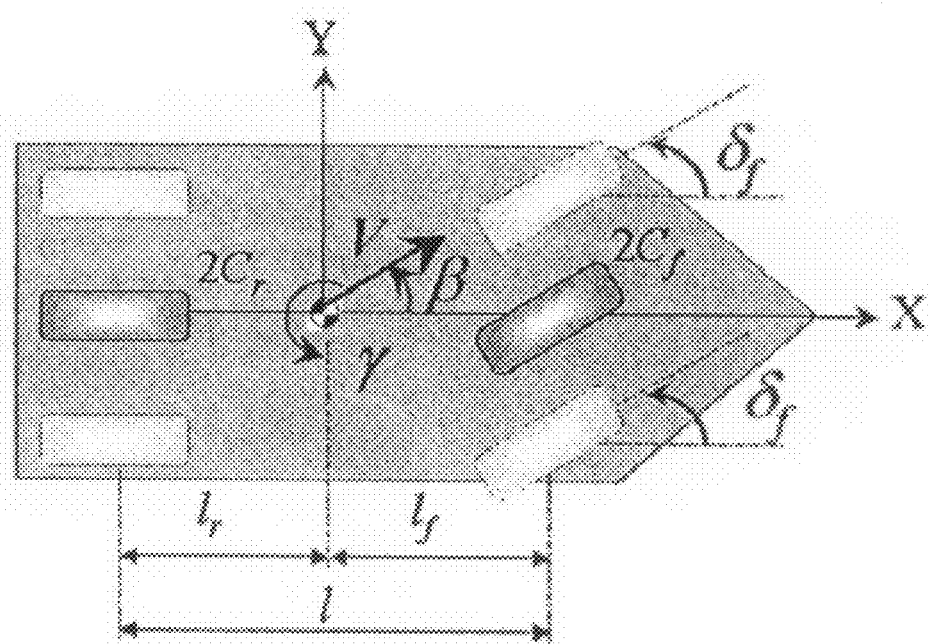
FIG. 3 shows an equivalent two-wheel model of automobile plane motion.

Now, the computation method of the feed-forward controller transfer function Gff(s) will be explained below. FIG. 3 shows an equivalent two-wheel model of automobile plane motion. This motion equation is given by Equations (5) and (6).

$$mV(\dot{\beta} + \gamma) = 2C_f \left(\delta_f - \frac{l_f}{V}\gamma - \beta\right) + 2C_r \left(\frac{l_r}{V}\gamma - \beta\right) \quad (5)$$

$$I_z \dot{\gamma} = 2 l_f C_f \left(\delta_f - \frac{l_f}{V}\gamma - \beta\right) - 2 l_r C_r \left(\frac{l_r}{V}\gamma - \beta\right) \quad (6)$$

Cr represents the cornering power of the rear wheel tires, and β represents the vehicle body sideslip angle. If the rotation angle δ sw of the steering shaft 3 is in proportion to the actual steering angle δ f of the front wheel tires 13,14 and the steering dynamics is negligible, Equation (7) is satisfied.

$$\delta_f = \frac{\delta_{sw}}{N} \quad (7)$$

When a Laplace transformation is applied to Equations (1) and (2), the yaw-rate response for steering wheel angle is given by Equation (8).

$$\frac{\gamma(s)}{\delta_f(s)} = \frac{k_\gamma}{\tau_\gamma s + 1} \quad (8)$$

The steady-state gain and the time constant of the yaw-rate are given by Equations (9) and (10).

$$k_\gamma = \frac{V}{l\left(1 + \frac{m(l_r C_r - l_f C_f)}{2l^2 C_f C_r}V^2\right)} \quad (9)$$

$$\tau_\gamma = \frac{I_z V}{2(l_f^2 C_f + l_r^2 C_r)} \quad (10)$$

If the vehicle body yaw-rate completely matches with the target yaw-rate when the front wheel active steering controller 9 is used, the transfer function Gff(s) of the feed forward controller is given by Equation (11).

$$G_{ff}(s) = \frac{\delta_f(s)}{\delta_{sw}(s)} = \frac{k_{\gamma d}}{k_\gamma} \cdot \frac{\tau_\gamma s + 1}{\tau_{\gamma d} s + 1} \quad (11)$$

Equation (11) can be rewritten by Equation (12).

$$G_{ff}(s) = \frac{k_{\gamma d}}{k_\gamma} + \frac{k_{\gamma d}}{k_\gamma} \cdot \frac{(\tau_\gamma - \tau_{\gamma d})s}{\tau_{\gamma d} s + 1} \quad (12)$$

In the above equation, the first term of the right side corresponds to the steering angle ratio of the steering wheel angle to the front wheel tire actual steering angle in case of a steady-state steering wheel angle input.

When the differential operation of the steering wheel angle is not considered, the steering angle ratio of the steering wheel angle to the front wheel actual steering angle is expressed by Equation (13).

$$\frac{\delta_{sw}}{\delta_f} = \frac{\left(1 + \frac{m l_r V^2}{2l l_f C_f}\right)}{\left(1 + \frac{m(l_r C_r - l_f C_f)V^2}{2l^2 C_f C_r}\right)} \cdot \frac{l_f}{l} \cdot N \quad (13)$$

Figure 4:
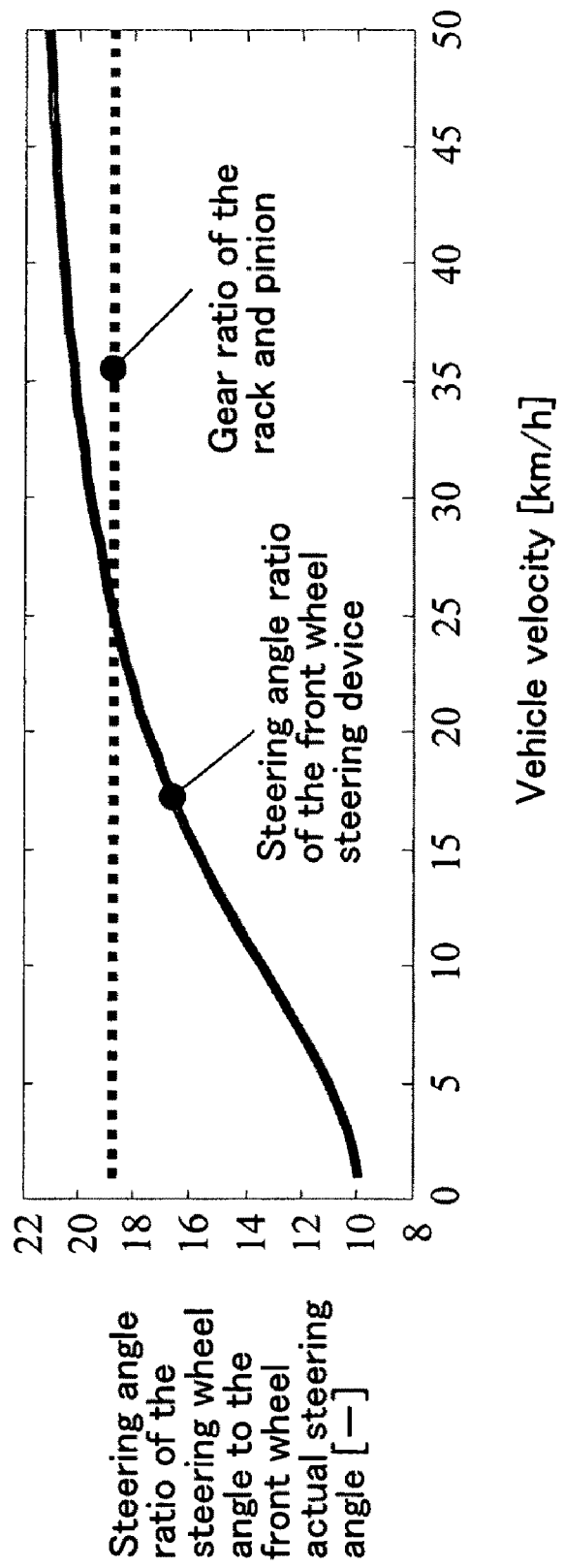
FIG. 4 shows the steering angle ratio of the front wheel actual steering angle and the steering wheel angle for the varied vehicle velocity computed in the front wheel active steering controller 9.

The ratio of the steering angle for the varied vehicle velocity is shown in FIG. 4 when the parameters given to the test vehicle are used in Equation (13). FIG. 4 shows that the steering angle ratio is smaller than the gear ratio of the rack and pinion when the vehicle velocity is lower than 25 km/h, and the steering angle ratio is larger than the gear ratio of the rack and pinion when the vehicle velocity is higher than 25 km/h.

Figure 5:
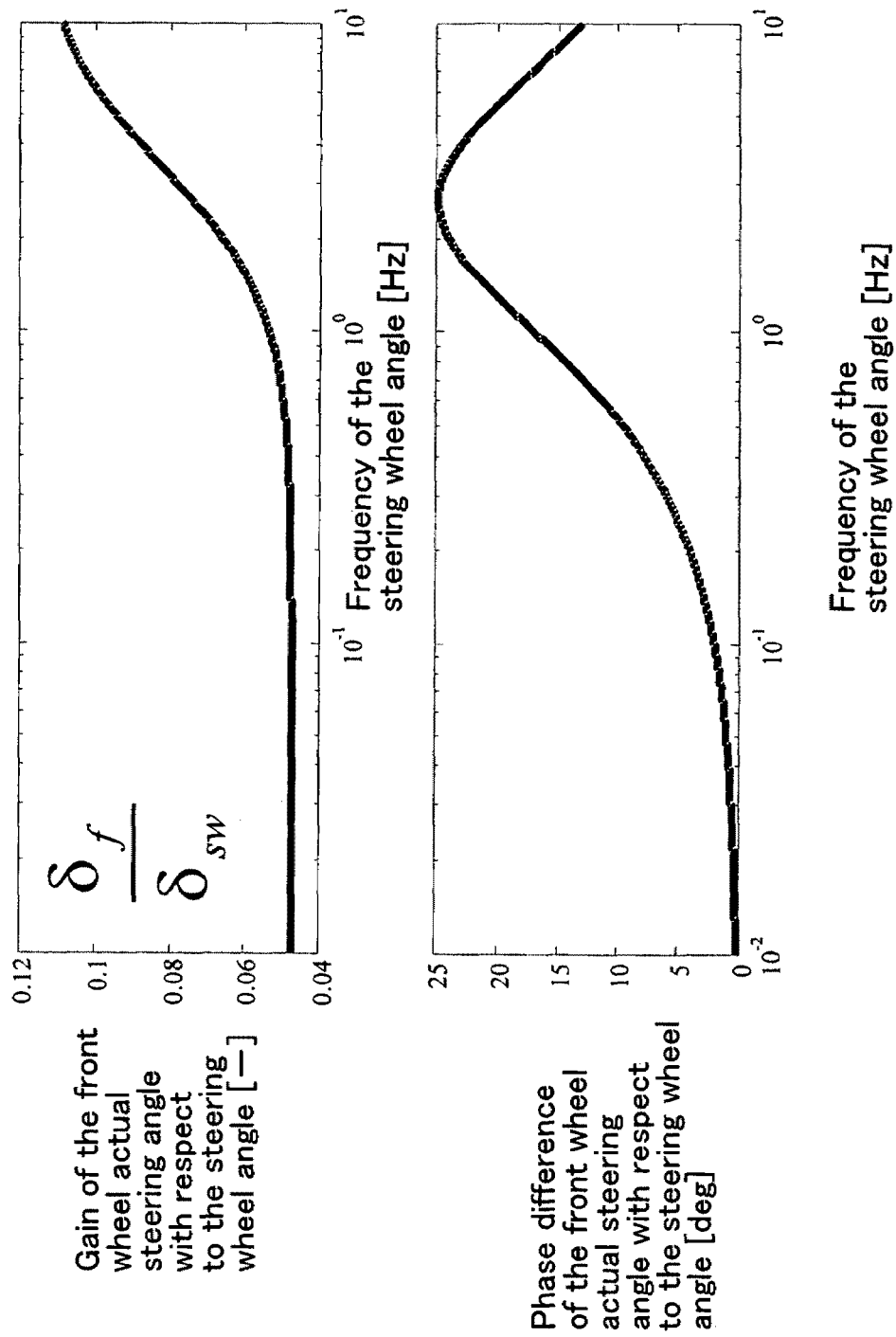
FIG. 5 shows a frequency characteristic of the steering angle ratio of the steering wheel angle to the front wheel actual steering angle at a vehicle velocity of 50 km/h.

The second term of the right side of Equation (12) corresponds to the steering angle ratio in case of an active steering wheel angle input. This second term is called "derivative steering" since a differential term of the steering wheel angle is included. FIG. 5 shows a frequency characteristic of the steering angle ratio of the front steering actual steering angle to the steering wheel angle in case of a vehicle velocity of 50 km/h, for example. The steering angle ratio is increased for the steering wheel angle at a high frequency in order to compensate the delay in the vehicle response.

Figure 2:
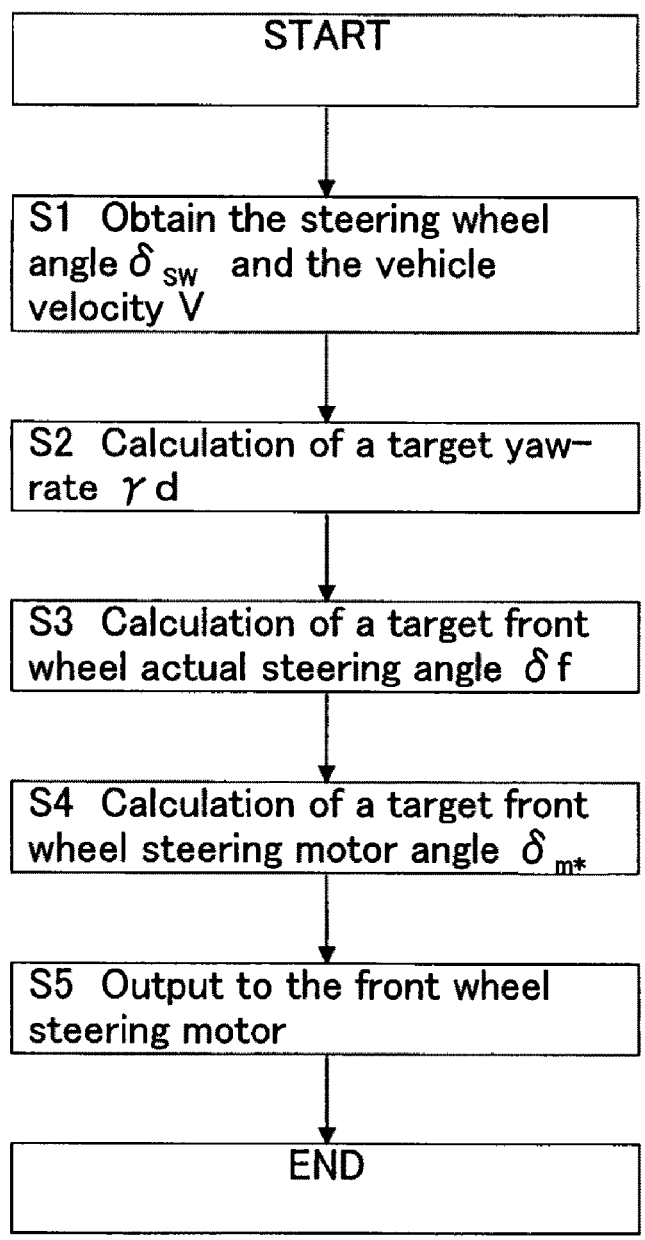
FIG. 2 is a flow chart showing the operation of the front wheel active steering controller 9 according to one embodiment of the present invention.

The front wheel active steering controller 9 computes the target front wheel steering motor angle δ m* using Equation (14) in order to achieve the target front wheel actual steering angle δ f (Step S4 in FIG. 2).

$$\delta_m^* = N \delta_f \quad (14)$$

Next, the front wheel active steering controller 9 converts the target motor angle δ m* to a pulse voltage so that the actual angle detected by the rotation angle detector in the front wheel steering motor 4 becomes consistent with the target motor angle δ m* that is computed at Step S4, outputs it to the front steering motor 4 (Step S5), and then ends the process.

Figure 6:
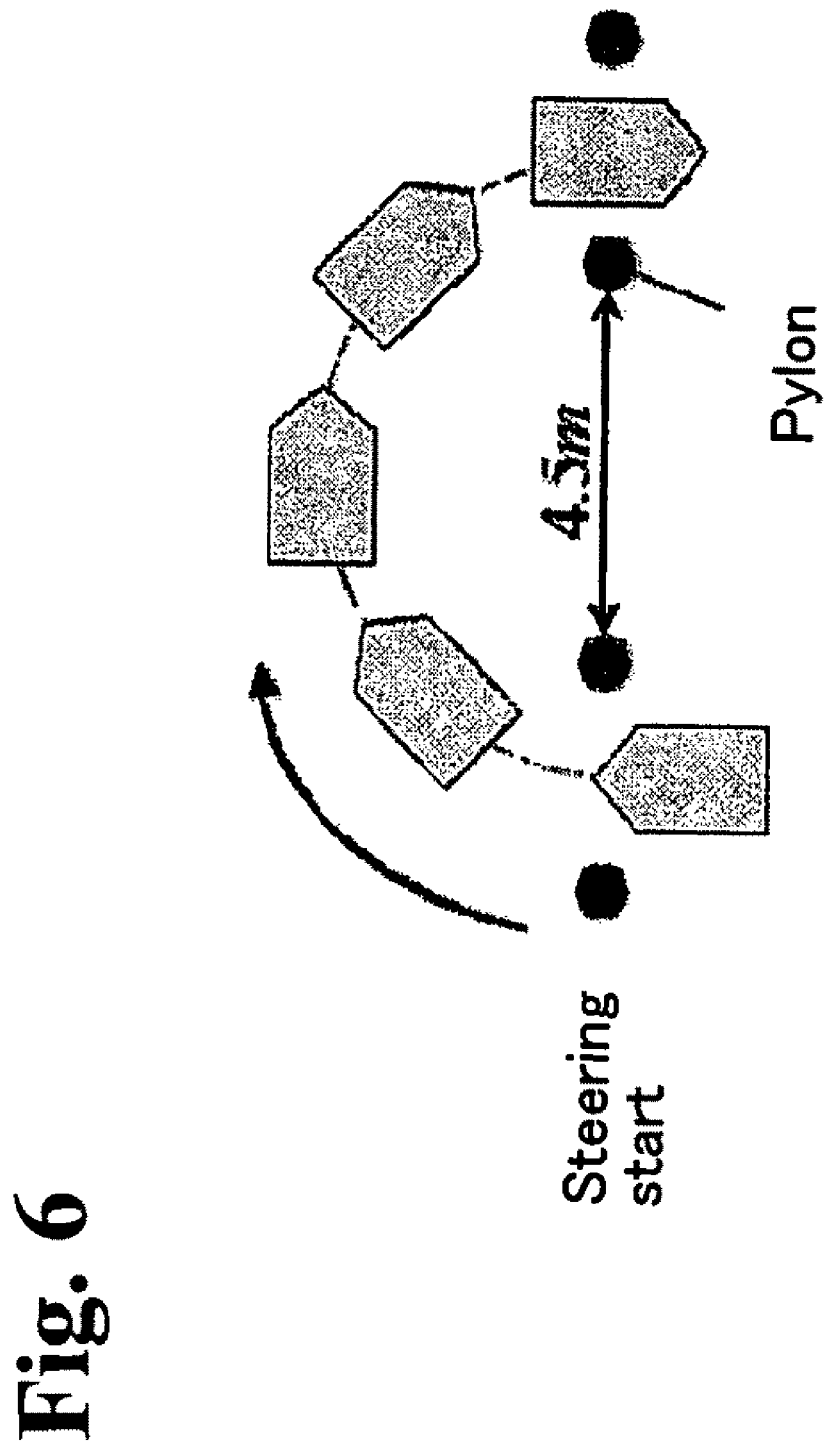
FIG. 6 shows a model course for a U turn test.
Figure 7:
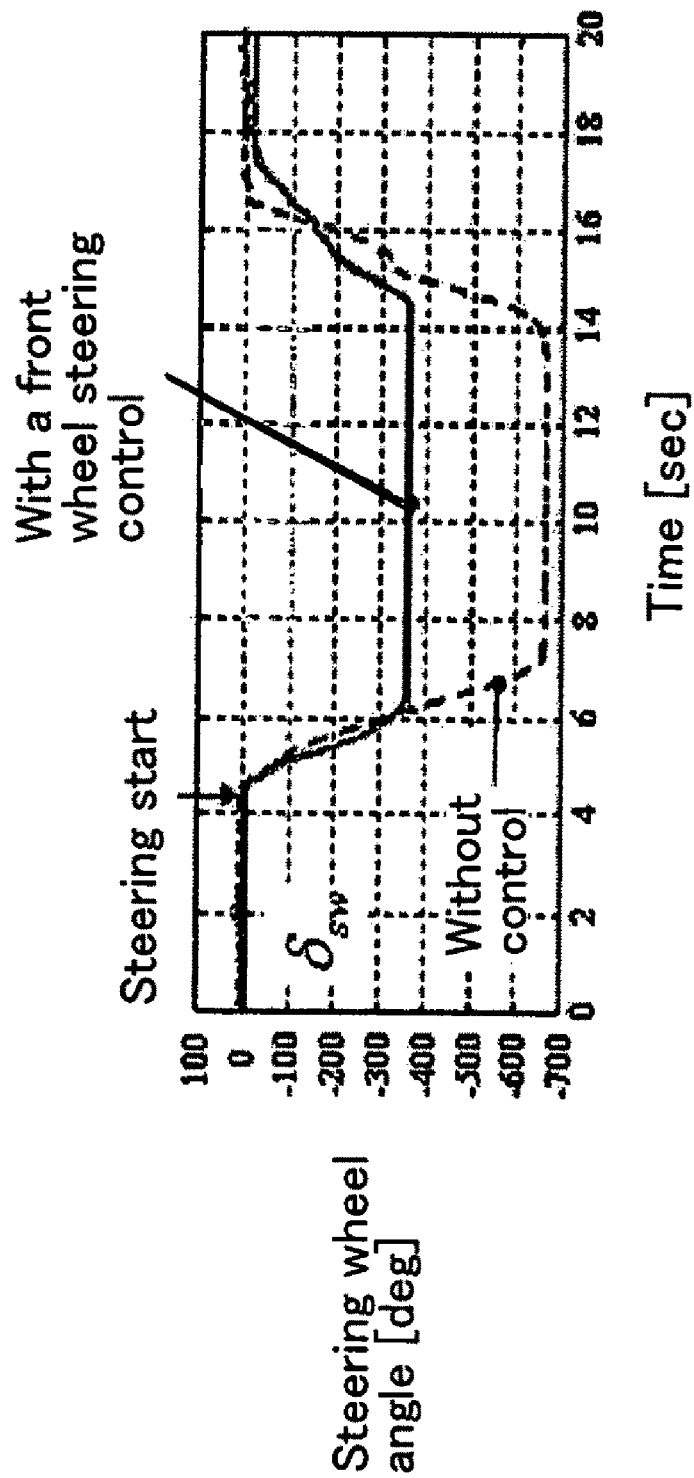
FIG. 7 shows a comparison of the time responses of the steering wheel angle in case of a U turn test.

In order to verify the improved maneuverability at a low velocity, the U turn test shown in FIG. 6 was performed. The vehicle velocity was maintained constant at 3 km/h. The steering wheel angle that is necessary to pass the test course shown in FIG. 6 was measured. FIG. 7 shows that the driver was rotating the steering wheel more than 650 degrees in case of without control. When the steering angle ratio was controlled as shown in FIG. 4, a U turn was completed by about one rotation (360 degrees) and the driver's maneuverability is significantly improved.

Figure 8:
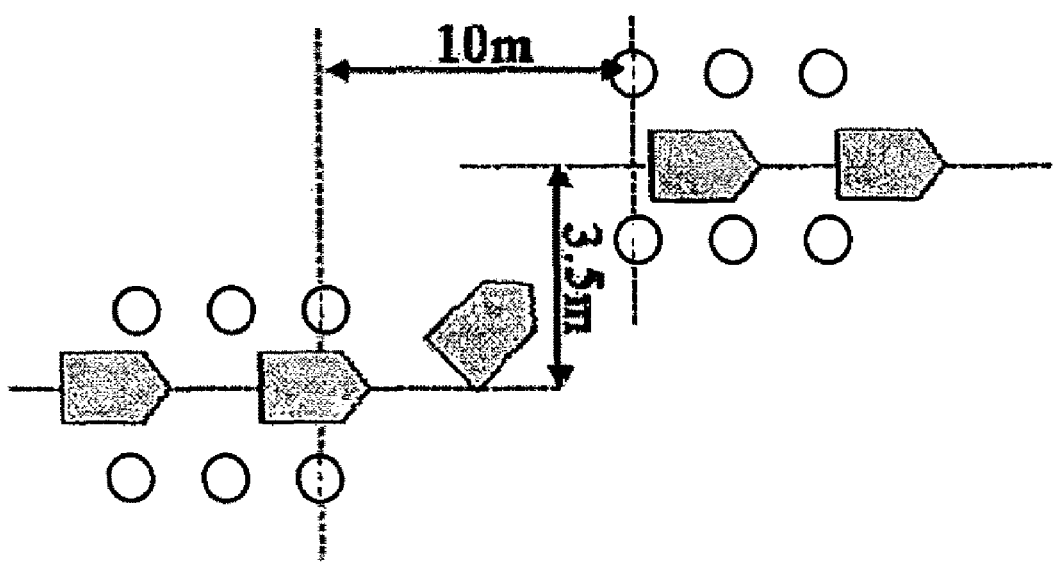
FIG. 8 shows a model course for a lane change test.
Figure 9:
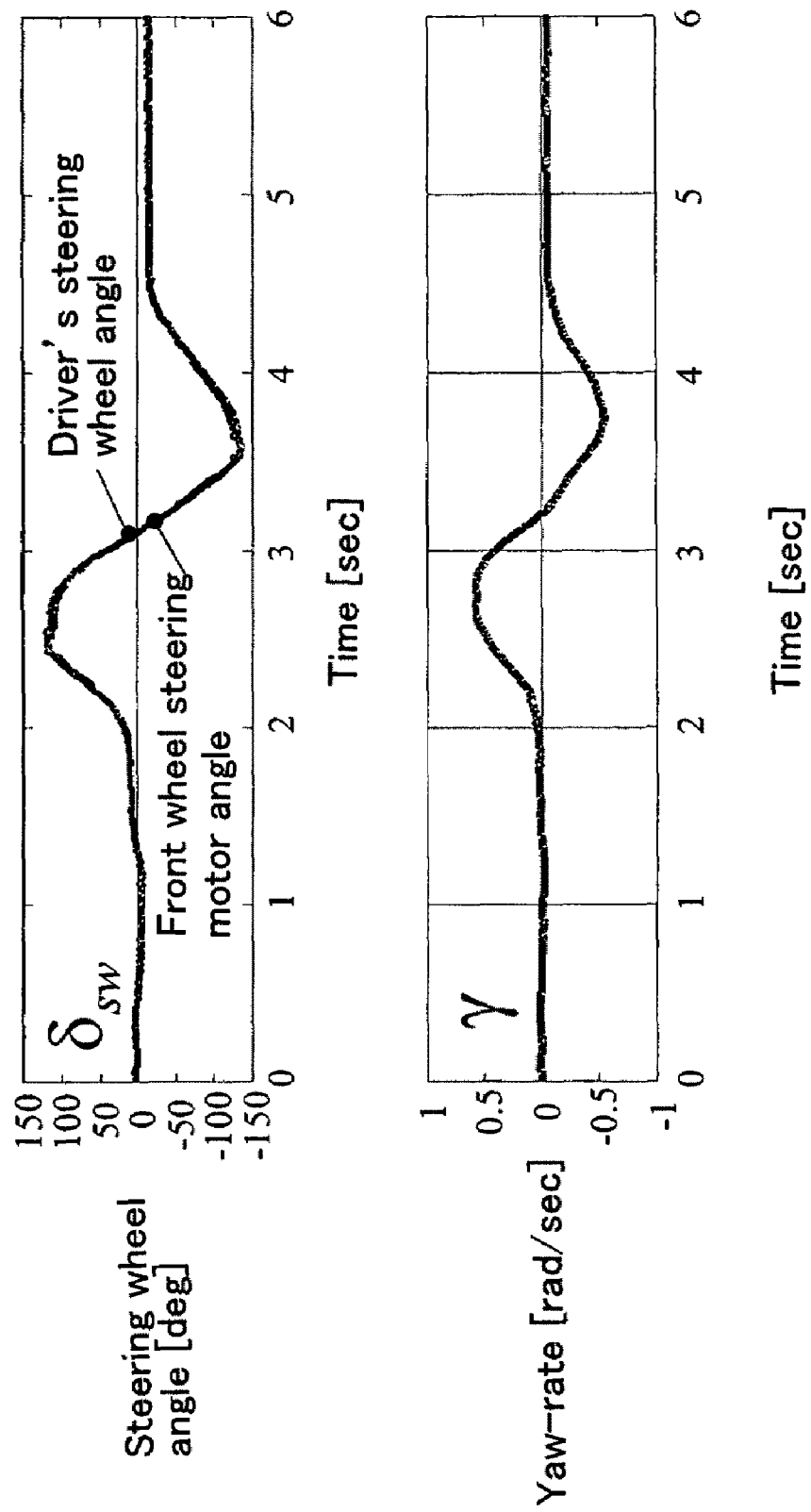
FIG. 9 shows the time responses of the steering wheel angle, the front wheel steering motor angle and the vehicle yaw-rate in case of lane change test without active front wheel steering control.
Figure 10:
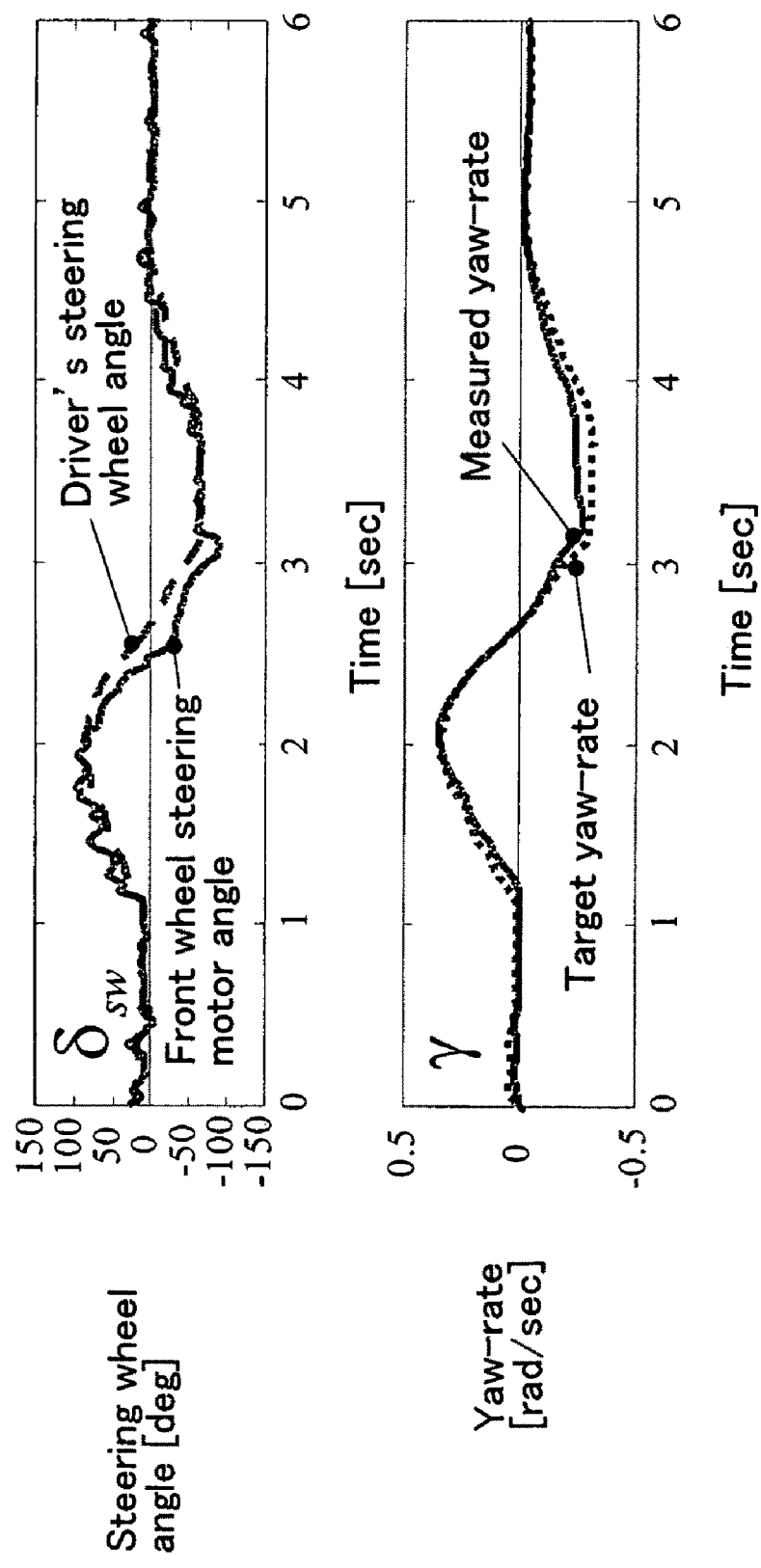
FIG. 10 shows the time domain responses of the steering wheel angle, the front wheel steering motor angle and the vehicle yaw-rate in case of a lane change test when the active front wheel steering control is applied.
Figure 11:
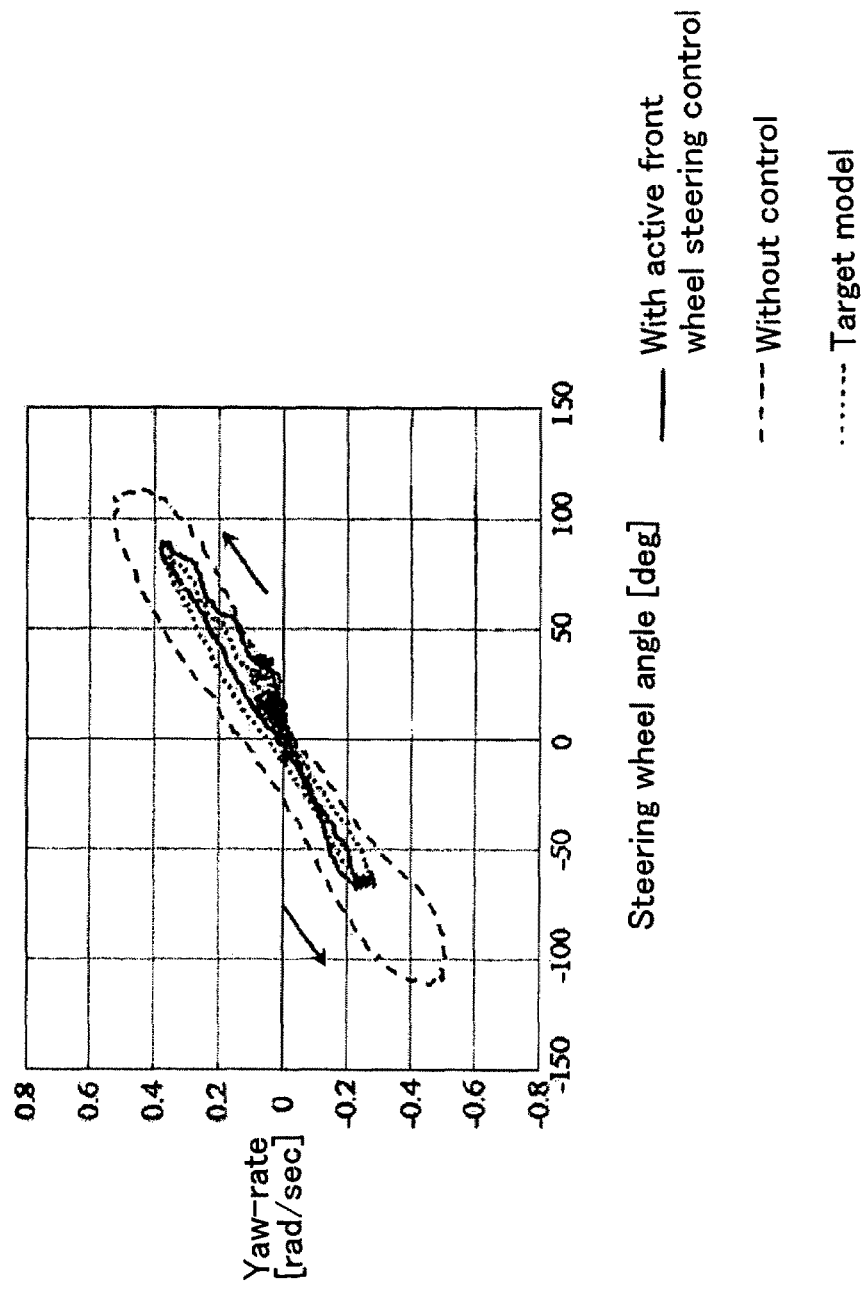
FIG. 11 shows a Lissajous curve of the vehicle yaw-rate for the steering wheel angle.

In order to verify the effect of the front wheel active steering controller in case of an active steering input at a high velocity, the lane change test shown in FIG. 8 was conducted. The test was performed at a constant vehicle velocity of 30 km/h. FIG. 9 and FIG. 10 show the time domain response of the driver's steering wheel angle, the front wheel steering motor angle, and the yaw-rate in case of without control and usage of the front wheel active steering controller respectively. As shown in FIG. 10 the time response of the steering wheel angle shows that the front wheel motor steers earlier than driver's steering wheel angle when the control was applied. This is an effect of the differential steering. FIG. 11 shows Lissajous curves of the vehicle yaw-rate and the steering wheel angle in case of a lane change. The Lissajous curves of vehicle yaw-rate and steering wheel angle are closer to the linear relationship than the case of without control. This means that the phase delay of the yaw-rate with respect to the steering wheel angle is reduced. The controller according to the present invention enables a vehicle to pass the course with a smaller steering wheel angle rotated by the driver.

Accordingly, a vehicle with a high handling and stability in the entire area of the vehicle velocity can be realized by detecting the driver's steering wheel angle and the vehicle velocity and varying the steering angle ratio of the steering wheel angle to the actual steering angle of the front wheel tires through the motor control based on the detected information.

One embodiment of the present invention is explained above, however the scope of the present invention should not be construed to be limited to the described embodiment and the scope covers other configurations and modifications that are not apart from the spirit of the invention.

For example, the computing means for target front wheel actual steering angle was described as the feed forward control method, the present invention also covers a feed back control and other control methods.

INDUSTRIAL APPLICABILITY

According to the present invention, the better handling and stability of a vehicle are achieved.

The vehicle steering control is performed based on a target front wheel actual steering angle by computing a target yaw-rate based on the vehicle steering wheel angle and the vehicle velocity (a yaw-rate to maintain the vehicle body sideslip angle at center of gravity at zero, based on the steering wheel angle and the vehicle velocity obtained by the input means) and computing a target front wheel actual steering angle to achieve the target yaw-rate. According to this configuration the steering control design can be based on the vehicle handling and stability theories, the steering angle ratio of the steering wheel angle to the front wheel actual steering angle at a low velocity can be smaller, and the maneuverability at a low velocity is significantly improved and the running stability is secured at a high velocity because the vehicle yaw-rate characteristic with a good handling and stability is used for the target yaw-rate.

The front wheel actual steering angle is computed from the steering wheel angle and its differential value. Since the front wheel actual steering angle is theoretically computed using this methodology, the delay of the vehicle response to the steering wheel angle is compensated in case of an active steering wheel angle input, and a vehicle steering control device that accurately operates in accordance with the driver's operational intention without instability can be configured.

The invention claimed is:

1. A front wheel steering control device for improving vehicle handling and stability, comprising, input means for obtaining a steering wheel angle $\delta$ SW and a vehicle velocity V;

first computing means for computing a yaw-rate $\gamma d$ for a vehicle which maintains a vehicle gravity center point sideslip angle at zero based on the steering wheel angle $\delta$ SW and the vehicle velocity V obtained by the input means based on a following equation (1);

$$\frac{\gamma_d(s)}{\delta_{sw}(s)} = \frac{k_{\gamma d}}{\tau_{\gamma d} s + 1} \tag{1}$$

wherein $k\gamma d$ and $\tau\gamma d$ are a steady-state gain and a time constant of the target yaw-rate respectively and are given by equations (2) and (3), and s is an operand of Laplace Transformation, $$k_{\gamma d} = \frac{V}{l_f \left(1 + \frac{m l_r V^2}{2 l l_f C_f}\right)} \cdot \frac{1}{N} \tag{2}$$

$$\tau_{\gamma d} = \frac{I_z V}{m l_r V^2 + 2 l l_f C_f} \tag{3}$$

wherein lf represents a distance between a front wheel axis and a gravity center point, l represents a wheelbase, N represents a gear ratio of a rack and a pinion, m represents a vehicle weight, lr represents a distance between a rear wheel axis and the gravity center point, Cr represents a cornering power of front wheel tires, and Iz represents a yaw inertial moment, second computing means for computing a target front wheel actual steering angle for realizing the yaw-rate that was calculated by the first computing means, based on a following equation (4);

$$\delta_f(s) = G_{ff}(s)\delta_{sw}(s) \tag{4}$$

wherein a feed-forward controller transform function Gff(s) is given by equation (5), $$G_{ff}(s) = \frac{k_{\gamma d}}{k_{\gamma}} + \frac{k_{\gamma d}}{k_{\gamma}} \cdot \frac{(\tau_{\gamma} - \tau_{\gamma d})s}{\tau_{\gamma d} s + 1}, \text{ and} \tag{5}$$

control means for performing a steering control of the vehicle based on the target front wheel actual steering angle calculated by the second computing means, wherein the target front wheel actual steering angle is calculated by adding a feed forward actual steering angle in proportion to the steering wheel angle of the vehicle to a feed forward actual steering angle that is a differential value of the steering wheel angle with a linear delay element, and when said vehicle velocity is below a predetermined value, a steering angle ratio of the steering wheel angle and the front wheel actual steering angle is controlled to be smaller than the gear ratio of the rack and the pinion, and when said vehicle velocity is above the predetermined value, the steering angle ratio is controlled to be greater than the gear ratio of the rack and the pinion.

2. A front wheel steering control device of claim 1, wherein a response of the yaw-rate for the steering wheel angle is set to a first order delay characteristic in order to improve stability at a high speed.

* * * * *